Patented Oct. 10, 1933

1,929,452

UNITED STATES PATENT OFFICE 1,929,452

PROCESS FOR OBTAINING ACID METAL PHOSPHATES

Robert L. Sebastian, Montclair, N. J., assignor to The American Agricultural Chemical Company, a corporation of Delaware No Drawing. Application August 26, 1930
Serial No. 477,987

6 Claims. (Cl. 23—109)

This invention is applicable to the recovery of acid metal phosphates from materials containing inorganic phosphates and/or acid phosphates. Suitable materials are; animal bone matter, deposits containing recent or fossil bone matter, mineral deposits containing phosphates of any kind, such as apatite, and artificial materials, such as superphosphates.

The raw material is first treated with sulphuric acid of a concentration and quantity suitable to replace the combined phosphoric acid with the resultant formation of free phosphoric acid. Acid of 75%, $H_2SO_4$ content, may be satisfactorily employed. The mixture of acid and raw material is denned to complete the reaction and the mixture of gangue or earthy material carrying soluble reaction products is then extracted by the use of an extraction liquid containing an organic component. The organic component should be present to the extent of at least 25% of the total, and for best results should predominate in weight. Such an extraction liquid may, for example, consist of ethyl alcohol and water in which the ethyl alcohol is present in excess of 50% by weight of the total. The extraction liquid may also be made up by selecting and/or combining those members of the oxygenated hydrocarbon liquids in which phosphoric acid is soluble. For this purpose I may define liquids to be those substances which are fluid at or near normal temperatures, say below 50° C. In general, the oxygenated hydrocarbon liquids of not exceeding 8 carbon atoms in the chain carrying the oxygen group may be employed for this purpose. All of the aliphatic alcohols of not exceeding 8 carbon atoms appear also to be satisfactory.

The sulphuric acid may be mixed with the raw material in any desired type of mixing apparatus, and the extraction liquid may be incorporated with the products of the reaction in any suitable type of mixing apparatus. The extraction liquid may be thereafter separated from the residue of undissolved material by settling and decanting, by filtration, centrifuging, or any other suitable procedure. After separation of the extraction liquid, the last traces may be removed by steaming. The undissolved material may be thereafter washed with water for the separation of an additional quantity of phosphoric material of lesser purity.

I have found that the phosphoric acid so produced may be economically separated from the extraction liquid and converted directly to highly desirable end products by admixing or contacting the extraction liquid containing dissolved phosphoric acid with a metal phosphate which is either neutral or dibasic. Such phosphates will be hereinafter denoted generally by the term "phosphates of greater basicity than mono basic". The effect of so contacting or admixing the extraction liquid with such a phosphate is to convert the dissolved phosphoric acid into an acid phosphate which is either substantially insoluble in the extraction liquid or manifests a lesser solubility therein, and which therefore separates from the extraction liquid. If a dibasic phosphate is desired, it is, of course, necessary to admix with the extraction liquid a neutral (tribasic) phosphate; whereas, if a mono basic phosphate is desired, it may be produced by admixing with the extraction liquid either a neutral or dibasic phosphate in the proper stoicheiometrical proportions.

One preferred application of my process is to the manufacture of acid phosphates of the alkaline earth metals, as, for example, calcium phosphate, and for this purpose the extraction liquid is admixed with either neutral or dibasic calcium phosphate, depending on the end product desired. This affords a particularly direct and economical method for the manufacture of acid calcium phosphates including those which are designated in the trade as double and treble superphosphates. For this purpose, I may admix the extraction liquid containing dissolved phosphoric acid with a rock containing calcium phosphate, such as apatite. The acid calcium phosphate thereby produced may be separated from the extraction liquid by decantation, and the insoluble acid calcium phosphate may be separated from the last traces of extraction liquid by any suitable means, such as filtration, or by the use of a centrifugal. Alternatively, the acid calcium phosphate so produced may be dried, with the consequent vaporization of the solvent which may be conducted away and recovered by condensation.

In certain modifications of the process it is desirable to treat the phosphate material with considerable excess of sulphuric acid. This insures the maximum recovery of the combined phosphoric acid. The use of an excess of sulphuric acid results in the presence of free sulphuric acid in the extraction liquid and this may be desirable when making alkaline earth acid phosphates, as, for example, when contacting the extraction liquid with a rock containing tri-calcium phosphate.

A particularly efficient separation is obtained where the extraction liquid is water immiscible.

For the purposes of this application, I may define a water immiscible liquid to be one which is not soluble in water or aqueous solutions of phosphoric acid in excess of 10% by weight of the total, although a solubility under 2% is desirable. A converse tendency of water to dissolve in the extraction liquid is not ordinarily detrimental, provided the extraction liquid does not thereby acquire water solubility in excess of the limit mentioned.

Such a water immiscible extraction liquid may consist of a single organic substance which is water immiscible and is alone a solvent for othophosphoric acid, as, for example, amyl alcohol, or may be made up predominantly of substances of this character. The term "amyl alcohol" as herein employed, denotes any of the pure amyl alcohols and/or any mixture of the isomeric amyl alcohols. The oxygenated hydrocarbon liquids, particularly those of not exceeding 8 carbon atoms in the chain carrying the hydroxyl group, appear to be suitable for this purpose, although I prefer the water immiscible aliphatic alcohols of not exceeding 8 carbon atoms to the molecule.

The foregoing description is for purposes of illustration and not of limitation, and it is therefore my intention that the invention be limited only by the appended claims or their equivalents in which I have endeavored to claim broadly all inherent novelty.

I claim:

1. In the process of obtaining phosphoric acid conversion products from materials containing inorganic phosphates by admixing a phosphate containing material with sulphuric acid in quantity sufficient to form orthophosphoric acid, thereafter contacting the admixed materials with an extraction liquid consisting predominantly of a water immiscible aliphatic alcohol or alcohols of not exceeding 8 carbon atoms, thereafter separating said extraction liquid and dissolved phosphoric acid from undissolved material and removing the dissolved phosphoric acid from said extraction liquid, the step of removing the dissolved phosphoric acid from said extraction liquid by contacting said extraction liquid with a metal phosphate of greater basicity than mono basic, thereby converting said dissolved phosphoric acid to an acid metal phosphate.

2. Process according to claim 1, in which the dissolved phosphoric acid is removed by contacting said extraction liquid with a tribasic metal phosphate.

3. In the process of obtaining phosphoric acid conversion products from materials containing inorganic phosphates by admixing a phosphate containing material with sulphuric acid in quantity sufficient to form orthophosphoric acid, thereafter contacting the admixed materials with an extraction liquid consisting predominantly of a water immiscible aliphatic alcohol or alcohols of not exceeding 8 carbon atoms, thereafter separating said extraction liquid and dissolved phosphoric acid from undissolved material and removing the dissolved phosphoric acid from said extraction liquid, the step of removing the said dissolved phosphoric acid by contacting said extraction liquid with an alkaline earth phosphate of greater basicity than mono basic.

4. Process according to claim 3, in which the alkaline earth metal phosphate employed is the tribasic phosphate.

5. In the process of obtaining phosphoric acid conversion products from materials containing inorganic phosphates by admixing a phosphate containing material with sulphuric acid in quantity sufficient to form orthophosphoric acid, thereafter containing the admixed materials with an extraction liquid consisting predominantly of a water immiscible aliphatic alcohol or alcohols of not exceeding 8 carbon atoms, thereafter separating said extraction liquid and dissolved phosphoric acid from undissolved material and removing the dissolved phosphoric acid from said extraction liquid, the step of removing the dissolved phosphoric acid from said extraction liquid by contacting said extraction liquid with a calcium phosphate of greater basicity than mono basic.

6. Process according to claim 5, in which the calcium phosphate employed is tricalcium phosphate.

ROBERT L. SEBASTIAN.